United States Patent

Ure

[11] Patent Number: 5,643,468
[45] Date of Patent: Jul. 1, 1997

[54] METHOD AND APPARATUS FOR DISPLACING LIQUOR FROM A SLURRY OF PARTICULATE SOLID MATERIAL

[75] Inventor: Alan Macpherson Ure, Stockton-on-Tees, United Kingdom

[73] Assignee: Imperial Chemical Industries PLC, United Kingdom

[21] Appl. No.: 491,979
[22] PCT Filed: Jan. 24, 1994
[86] PCT No.: PCT/GB94/00132
§ 371 Date: Jul. 20, 1995
§ 102(e) Date: Jul. 20, 1995
[87] PCT Pub. No.: WO94/17892
PCT Pub. Date: Aug. 18, 1994

[30] Foreign Application Priority Data

Feb. 5, 1993 [GB] United Kingdom ............... 9302333

[51] Int. Cl.⁶ .................. B01D 37/00; B01D 33/04
[52] U.S. Cl. .............. 210/771; 210/772; 210/783; 210/805; 210/188; 210/398; 210/400; 210/406
[58] Field of Search ........................ 210/765, 768, 210/772, 771, 780, 783, 784, 805, 400, 402, 406, 416.1, 398, 188

[56] References Cited

U.S. PATENT DOCUMENTS

| | | |
|---|---|---|
| 3,348,682 | 10/1967 | Aulich et al. |
| 4,014,736 | 3/1977 | Sexton. |
| 4,046,621 | 9/1977 | Sexton. |
| 4,380,662 | 4/1983 | Hanotier et al. |
| 4,670,587 | 6/1987 | Saska. |
| 5,091,079 | 2/1992 | Gayman ............... 210/400 |
| 5,093,001 | 3/1992 | Ueda ................... 210/403 |
| 5,175,355 | 12/1992 | Streich et al. |
| 5,200,557 | 4/1993 | Gee et al. |
| 5,470,473 | 11/1995 | Park et al. .............. 210/402 |

OTHER PUBLICATIONS

BHS–FEST® Pressure/Vacuum Filters Brochure Jun. 1961, English Translation Included.

*Primary Examiner*—Robert Popovics

[57] ABSTRACT

A slurry is subjected to a filtration and washing process in order to separate the liquor from the solids. The filtration and washing process is carried out in a housing (101) enclosing an inert gaseous atmosphere which also passes through the filter cake and may be recycled, after treatment, to remove contaminants therefrom. To prevent recontamination of the filter cake as a result of the recycled gas entraining contaminant vapors within the housing (101), the gas is introduced into the housing (101) at a downstream location (152a, 166) relative to the direction of travel of the filter cake on a movable filter medium (100) and in such a way as to develop a contaminant concentration gradient whereby the cleanest cake is contacted by gas having the lowest contaminant level.

24 Claims, 2 Drawing Sheets

METHOD AND APPARATUS FOR DISPLACING LIQUOR FROM A SLURRY OF PARTICULATE SOLID MATERIAL

FIELD OF INVENTION

This invention relates to a filtration process in which a gaseous atmosphere is to be maintained over a solids material from which a liquor is to be displaced.

For instance, the gaseous atmosphere may be required in order to exclude at least in part oxygen from a system in which filtration takes place and, in this event, the gaseous atmosphere may typically comprise nitrogen or other inert gas. By "gas", we include media which, at room temperature and pressure tend to be in a phase other than the gas phase, but which under the conditions at which the filtration process is performed exist in the vapour phase, eg steam.

The invention finds specific application in, for example, those stages of terephthalic acid production involving separation of terephthalic acid crystals from a liquor in which the crystals are slurried.

BACKGROUND OF THE INVENTION

In the production of terephthalic acid, slurry streams containing terephthalic acid crystals may arise at one or more stages in the process and the nature of the liquor in which the crystals are slurried may vary. For instance, where the crude terephthalic acid is initially produced by the liquid phase oxidation of paraxylene in the presence of a carboxylic acid, such as acetic acid, and a suitable catalyst system (typically cobalt, manganese and bromine compounds), the crude terephthalic acid is withdrawn from the reactor as a slurry of terephthalic acid crystals in liquor comprising acetic acid and water with dissolved impurities, including terephthalic acid precursors such as 4-carboxybenzaldehyde (4-CBA) and paratoluic acid. If the crude terephthalic acid is thereafter purified by hydrogenation of an aqueous solution thereof (possibly preceded by a further stage of oxidation of the crude terephthalic acid in aqueous solution to convert 4-CBA to terephthalic acid), a slurry of purified terephthalic acid in aqueous liquor results where the aqueous liquor may have dissolved therein impurities such as paratoluic acid. In both cases, the terephthalic acid, either crude or purified, has to be freed of the corresponding liquor in a highly efficient manner.

A suitable technique in this latter respect is afforded by a combined filtration and washing system such as that disclosed in our prior published EP-A-502628 and copending International patent application No. PCT/GB 93/01019, the entire disclosures of which are incorporated herein by reference. In the systems disclosed in these prior applications, the displacement of liquor from wet filter cake comprising terephthalic acid (crude or after purification) is effected by transporting the filter cake on a belt filter through a washing zone in which an aqueous wash liquid is supplied to the filter cake in a number of stages at different points along the path of travel of the belt. The wash liquid displaces the liquor from the filter cake and the liquor together with the wash liquid passes through the filter material forming the belt.

In practice, it is necessary to establish an atmosphere of inert gas over the filter cake, for instance to exclude or control the level of oxygen present and/or to assist in drying of the filter cake. This inert gas may pass through the filter material in the washing zone and/or in a zone or zones downstream of the washing zone. Additional gas must be introduced in order to maintain the gaseous atmosphere. The inert gas may be nitrogen for instance, although in the case of the filter/washing system employed in the purification stage of the process, the inert gas may with advantage comprise steam for reasons disclosed in our co-pending International patent application No. PCT/GB 93/01033 (the entire contents of which are incorporated herein by reference).

SUMMARY OF THE INVENTION

The present invention seeks to provide an improved form of filtration and washing process and system.

According to one aspect of the present invention there is provided a method of displacing liquor from a solids material comprising:

forming the solids material into a layer on a movable filter medium;

transporting the layer by means of the filter medium through a washing zone in which the layer is contacted along the path of movement thereof with a wash medium, the wash medium serving to displace liquor from the layer and passing through the filter medium;

establishing over said layer a gaseous atmosphere from which gas passes through the layer; and supplying gas to the gaseous atmosphere so as to produce a concentration gradient within the gaseous atmosphere such that the liquor content of the gas passing through said layer increases in a direction counter-current to the direction of travel of said layer.

The concentration gradient may be substantially continuous lengthwise of the direction of travel of said layer or it may vary in a stepwise manner.

The concentration gradient may be produced by effecting flow of said gas in countercurrent relation with the direction of travel of the layer of solids material whereby liquor evaporating from the layer of solids material in said zone and upstream of said zone is substantially prevented from passing downstream of said zone.

Alternatively the concentration gradient may be produced by dividing the region in which the gaseous atmosphere is established into a number of zones lengthwise of the direction of travel of said layer, such that the level of contamination of the gas with said liquor differs from one zone to another. Thus, for instance, the gas to be introduced into one zone adjacent the downstream end of the path of travel of said layer may be subjected to more intensive clean-up than gas to be introduced into one or more upstream zones. The division of gaseous atmosphere region into substantially isolated zones may be effected by means of suitable partitioning devices such as hood arrangements each arranged in superimposed relation with a corresponding section of the path of travel of said layer and to which gas having a level of contamination substantially less than that of the layer is supplied.

The gas supplied to the gaseous atmosphere is preferably at least in part (usually at least a major part) gas recycled from the filtrate side of the filter medium after treatment to reduce the level of contamination with liquor. The recycled gas may be supplemented with clean make-up gas as necessary. However, we do not exclude the possibility of supplying to the gaseous atmosphere fresh gas rather than recycled gas. In this event, where the gas recovered from the filtrate side of the filter medium it may be used elsewhere in the process, particularly where the gas employed is steam.

According to a second aspect of the present invention there is provided a method of displacing liquor from a solids material comprising:

forming the solids material into a layer on a movable filter medium;

transporting the layer by means of the filter medium through a washing zone in which the layer is contacted along the path of movement thereof with a wash medium while maintaining in a region over the layer a gaseous atmosphere, the wash medium serving to displace liquor from the layer and passing, together with the liquor and gas from said atmosphere, through the filter medium;

recovering the gas and treating it to eliminate or at least reduce contamination thereof by the liquor; and reintroducing the treated gas into said atmosphere at a location such that the gas passing through the layer at a location downstream of, or within a downstream section of, the washing zone is less contaminated with liquor than that passing through the layer at a location upstream of, or within an upstream section of, the washing zone.

Conveniently the washing zone comprises a series of washing stages arranged in succession along the path of travel of the filter medium and the washing medium may be passed through the washing stages in counter-current relation with the direction of movement of the filter medium.

In one form of the invention, the recovered gas is separated into two streams which are treated to differing extents such that one stream has a lower contaminant level than the other, and in which the two streams are reintroduced into said atmosphere at different locations, said one stream being reintroduced at a location downstream of the location at which the other stream is reintroduced. The recovered gas may be subjected to cooling prior to being split into two streams so that contaminants in the vapour phase are condensed and thereby separated from the gas.

According to a further aspect of the invention there is provided a system for processing a slurry comprising a solids material and a liquor, said system comprising:

means for filtering the solids material to form a layer thereof on a movable filter medium;

a washing zone;

means for driving the filter medium so as to transport the layer through the washing zone;

means for applying wash medium to the layer during traverse of the washing zone, the wash medium serving to displace liquor from the layer and passing through the filter medium; and means for establishing in said washing zone and/or a zone downstream thereof a gaseous atmosphere from which gas passes through the layer and the filter medium, said atmosphere-establishing means being arranged to produce a concentration gradient such that the extent to which the gas passing through said layer and the filter medium is contaminated with said liquor decreases in the direction of travel of the filter medium.

According to another aspect of the invention there is provided a system for processing a slurry comprising a solids material and a liquor, said system comprising:

means for filtering the solids material to form a layer thereof on a movable filter medium;

a washing zone;

means for driving the filter medium so as to transport the layer through the washing zone;

means for supplying pressurised gas to the washing zone to establish a pressurised gaseous atmosphere on that side of filter medium on which the layer is formed; and means for applying wash medium to the layer during traverse of the washing zone, the wash medium serving to displace liquor from the layer and passing, together with the liquor and gas from said atmosphere, through the filter medium;

the pressurised gas supplying means being arranged to create a gas flow in countercurrent relation with the direction of travel of the layer of solids material whereby liquor evaporating from the layer of solids material in said zone and upstream of said zone is substantially prevented from passing downstream of said zone.

DETAILED DESCRIPTION OF THE INVENTION

In the context of terephthalic acid production, the filtration and washing may be applied to the separation of terephthalic acid crystals from a mother liquor comprising solvent employed either in an oxidation reaction for the production of terephthalic acid or in an hydrogenation reaction to purify crude terephthalic acid. In the former case, the solvent is usually an aliphatic carboxylic acid such as acetic acid and in the latter case the solvent is usually water. In both instances, the pressurised gas may comprise nitrogen; however, in the latter case, it is advantageously steam as the filtration process can be carried out in such a way that chilling of the filter cake is reduced or substantially eliminated as disclosed in our copending International Patent Application No. PCT/GB 93/01019.

The filter medium is suitably a metal gauze, or a cloth comprising a plastics material such as polyester, polypropylene, polyetheretherketone and the like in which case the cloth may be woven from filaments of the polymeric fibre using a weave suitable for the specific filtration application. Filter media woven from polyetheretherketone is particularly suitable in the production, and purification, of terephthalic acid, especially in the filtration of crude terephthalic acid in order to separate the same from acetic acid containing mother liquor. The filter medium my be configured as a loop which may be continuous (as in a belt filter of the Pannevis type) or may comprise a series of discrete sections (as in a rotary vacuum filter or a rotary pressure drum filter). In each case, the filter medium may be moved continuously or intermittently to convey the solids material through the washing zone. Such rotary vacuum filters and pressure drum filters of this type are described in the literature, see for example Pages 252–254 of the textbook "Industrial Filtration of Liquids" by D B Purchas (1967 edition, Chemical & Process Engineering Series published by Leonard Hill).

Where the filter system comprises a pressure drum filter, it will typically be of the type in which the wash liquor is supplied to the housing of the drum under pressure and in which the washed filter cake is subsequently dried by passage of gas through the filter cake as the drum continues to rotate to advance the filter cake from the washing zone towards a discharge point. In such an arrangement, the gas for drying of the filter cake is supplied in such a way as to establish over the filter cake a gaseous atmosphere with a concentration gradient in the manner referred to herein, ie so that the gas passing through the filter cake at locations near to the point of discharge of the filter cake from the drum is less contaminated than that passing through the filter cake at upstream locations in a direction towards the washing zone (s) of the drum. The variation in level of contamination of the gas may be progressive or it may be discrete (eg by partitioning the gas drying region into zones and introducing gas with differing levels of contamination into the zones, as previously referred to).

The washing zone suitably comprises a succession of stages in which, in each stage (other than the last), the incoming wash medium passes through the solids end the filter medium in counter-current relation to the direction of travel of the layer of solids material. In the last stage the wash medium is preferably fresh incoming water.

In a zone upstream of the washing zone, the solids material may be subjected to an initial filtration stage to separate a major part of the liquor from the solids material, the residual liquor content of the wet solids material thereafter being largely removed in the washing zone.

In a third zone downstream of the washing zone, the layer of solids material may be ejected, scraped off or otherwise removed from the filter medium. Where the solids material tends to adhere at least in part to the filter medium, the preferred method is to wash the layer of solids material off with an aqueous medium, preferably substantially pure water, which may be in the form of jets of liquid at the downstream end of the path of travel of the filter medium.

In the case of a continuous band, it is desirable to provide suitable means to pass liquid for example water or alkaline solution, through the returning part of the band to wash off downwardly facing adhering deposits into a receiver.

Desirably, there is a pressure differential across the movable filter medium, with the side of the filter medium on which the slurry is deposited being at a higher pressure than the other side of the filter medium. Suitably the differential pressure is at least 0.05 bar and, in the case of terephthalic acid production, no more than the pressure at which the oxidation or purification step (as the case may be) is carried out, for example 30 bar in the case of the oxidation reaction.

Preferably the pressure differential is 0.1 to 15 bar, more preferably, 0.2 to 7 bar and especially 0.3 to 3 bar, for example 0.6 bar.

Suitably the higher pressure side of the band is at substantially the same pressure or a higher pressure than the preceding step in the process, for example a crystallisation step or the oxidation step.

In the context of terephthalic acid production by liquid phase oxidation of paraxylene, the slurry of terephthalic acid in acetic acid is suitably deposited on the movable filter medium at a temperature of at least 60° C. and preferably 70° to 200° C., especially 80° to 150° C. Suitably the slurry is deposited in such a way that the saturation pressure of the feed is less than the absolute pressure on the lower (downstream) side of the filter medium.

Deposition of the slurry at elevated temperature is advantageous as improved filtration is possible due to the reaction medium being less viscous at elevated temperature. Furthermore there is less co-crystallisation of impurities for example 4-carboxybenzaldehyde, with the terephthalic acid product at elevated temperature.

The other individual steps of the terephthalic acid production process can be carried out conventionally. The liquid reaction medium normally comprises a catalyst, for example a cobalt/manganese/bromide catalyst system which is soluble in the reaction medium. Suitably the oxidation is carried out in the presence of an oxygen source for example air, at a pressure of 5 to 30 bars absolute, and preferably an oxygen concentration of 0 to 8% by volume in the gas leaving the reactor and at a temperature of 150° to 250° C. It is suitably a continuous process, and is preferably carried out in a stirred reactor. The reaction is exothermic and the heat of the reaction may conveniently be removed by evaporation of water and acetic acid from the reaction medium.

Suitably the crude terephthalic acid product obtained by liquid phase oxidation of paraxylene followed by filtration and washing of the crude product in accordance with the method according to the present invention is purified by a process which comprises:

dissolving the crude terephthalic acid in aqueous medium to produce a solution comprising terephthalic acid;

contacting, under reducing conditions, the said solution with hydrogen and a heterogeneous catalyst for the reduction of at least some impurities;

cooling the solution to precipitate solid purified terephthalic acid product; and recovering the said product from the solution.

If desired, in order to reduce the level of impurities present in the crude terephthalic acid, especially 4-CBA, the crude terephthalic acid may be dissolved in an aqueous medium and subjected to oxidation treatment using gaseous oxygen or other oxidising agents (not necessarily in the gaseous phase) to convert at least part of the 4-CBA impurity content to terephthalic acid.

Suitably the heterogeneous catalyst employed in the purification of the crude terephthalic acid product may be a supported noble metal catalyst, for example platinum and/or preferably palladium on an inert, for example carbon, support. The reduction is suitably carried out by passing the aqueous solution comprising terephthalic acid and impurities, for example 4-carboxybenzaldehyde, through a flooded bed of catalyst as a temperature of 250° to 350° C. in the presence of hydrogen. The solution suitably comprises 20 to 50% by weight of terephthalic acid.

The solution after reduction is suitably cooled to a temperature in the range 100° to 250° C. to separate pure terephthalic acid product from the solution. This solution is preferably subsequently cooled to a temperature in the range 15° C. to 100° C. or evaporated to produce a less pure precipitate and a mother liquor. The less pure precipitate is suitably separated from the mother liquor. The mother liquor from this separation my be recycled directly or indirectly to distillation and/or be used as the second aqueous medium to reslurry the crude terephthalic acid. If desired the less pure precipitate may be recycled to the oxidation step.

Alternatively, if purification is not employed, the terephthalic acid following filtration and washing may be removed (without necessarily slurrying it in aqueous medium) and used in polyester production, directly in some instances—eg production of polyethylene terephthalate articles such as bottles. This is made feasible by virtue of the reduced levels of contamination that can be achieved by means of an integrated solids-liquid separation and countercurrent solids washing process (eg by means of a belt filter system) combined with use of the inerting gas to suppress downstream contamination of the washed solids by liquor vapours.

BRIEF DESCRIPTION OF THE DRAWINGS

The invention will now be described by way of example only with reference to the accompanying drawings, in which.

DESCRIPTION OF THE PREFERRED EMBODIMENT(S)

Figure 1:
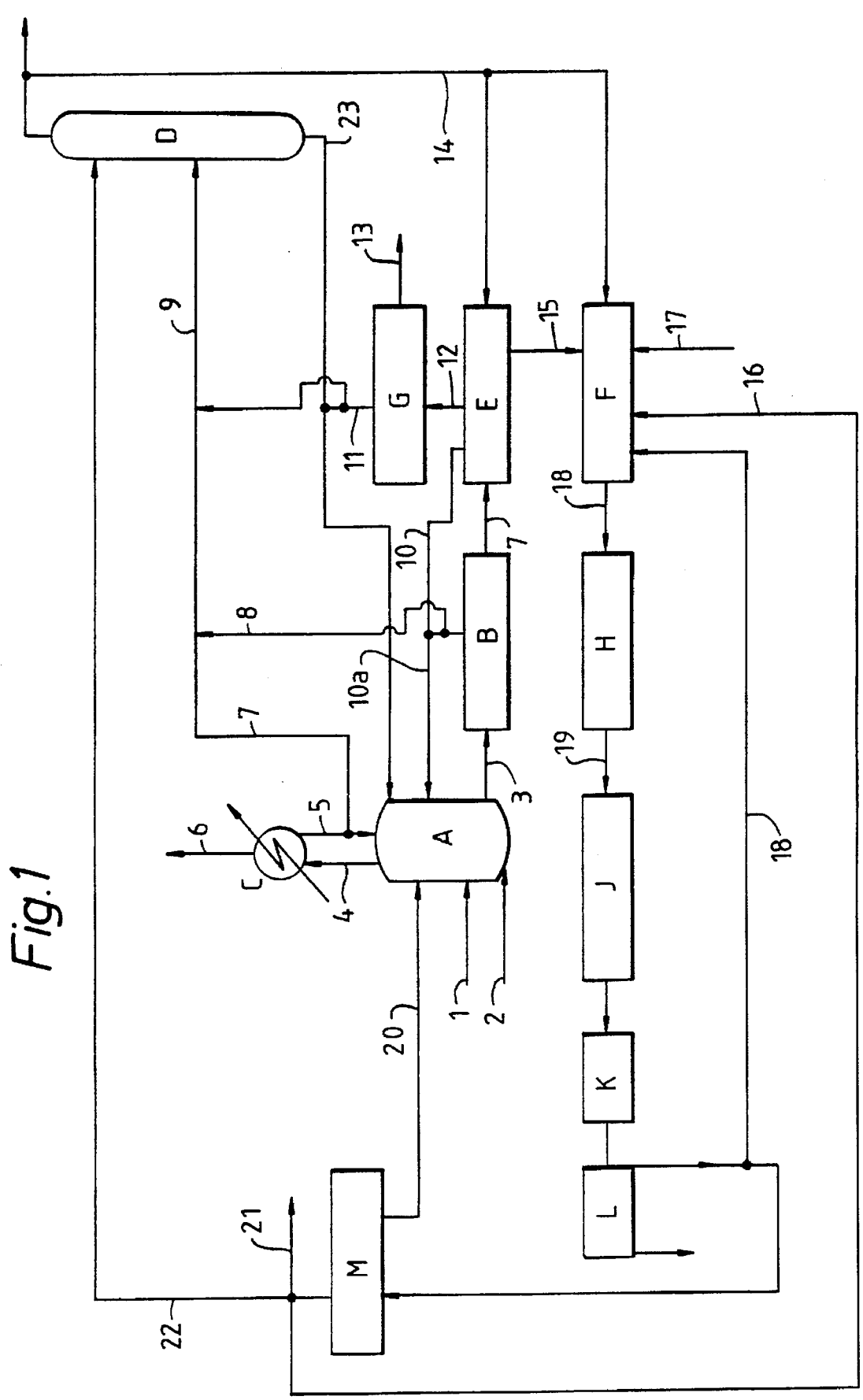
FIG. 1 is a flowsheet relating to a process for the production of purified terephthalic acid and to which the present invention can be applied.

Referring to FIG. 1, a reactor A for effecting the liquid phase oxidation of paraxylene is supplied with paraxylene and acetic acid containing a dissolved catalyst system comprising cobalt, manganese and bromine ions (via line 1) and with air via line 2. Product is withdrawn from the reactor A via line 3 and is passed to crystallisation section B. The temperature within the reactor A is regulated by withdrawing a mixture of acetic acid and water vapour from the reactor and passing the mixture to a condensing system C via line 4. Most of the condensate is returned to the reactor A via line 5 and non-condensibles may be vented via line 6. To control the water content within the reactor A, part of the condensate is removed from the condensing system via line 7 and passed to the distillation column D via line 9.

In the crystallisation section B the temperature is dropped to approximately 80° C. to 150° C. and the slurry containing crystalline terephthalic acid in mother liquor (mainly acetic acid) thereby produced is passed to a filtration stage E. Mother liquor recovered from the filtration stage is returned in part to the reactor A via lines 10 and 10a. Acetic acid may be recovered from crystallisation section B via streams 8 and 9 to the distillation column D and/or via streams 8 and 10a to the reactor A. The solids material recovered from filtration stage is transferred to reslurry stage F via line 15 where the recovered terephthalic acid crystals are reslurried with water which may comprise water derived from elsewhere in the process, eg from distillation column D via stream 14, recycled mother liquor via stream 18, recycled mother liquor via stream 16 and/or demineralised water via stream 17.

Figure 2:
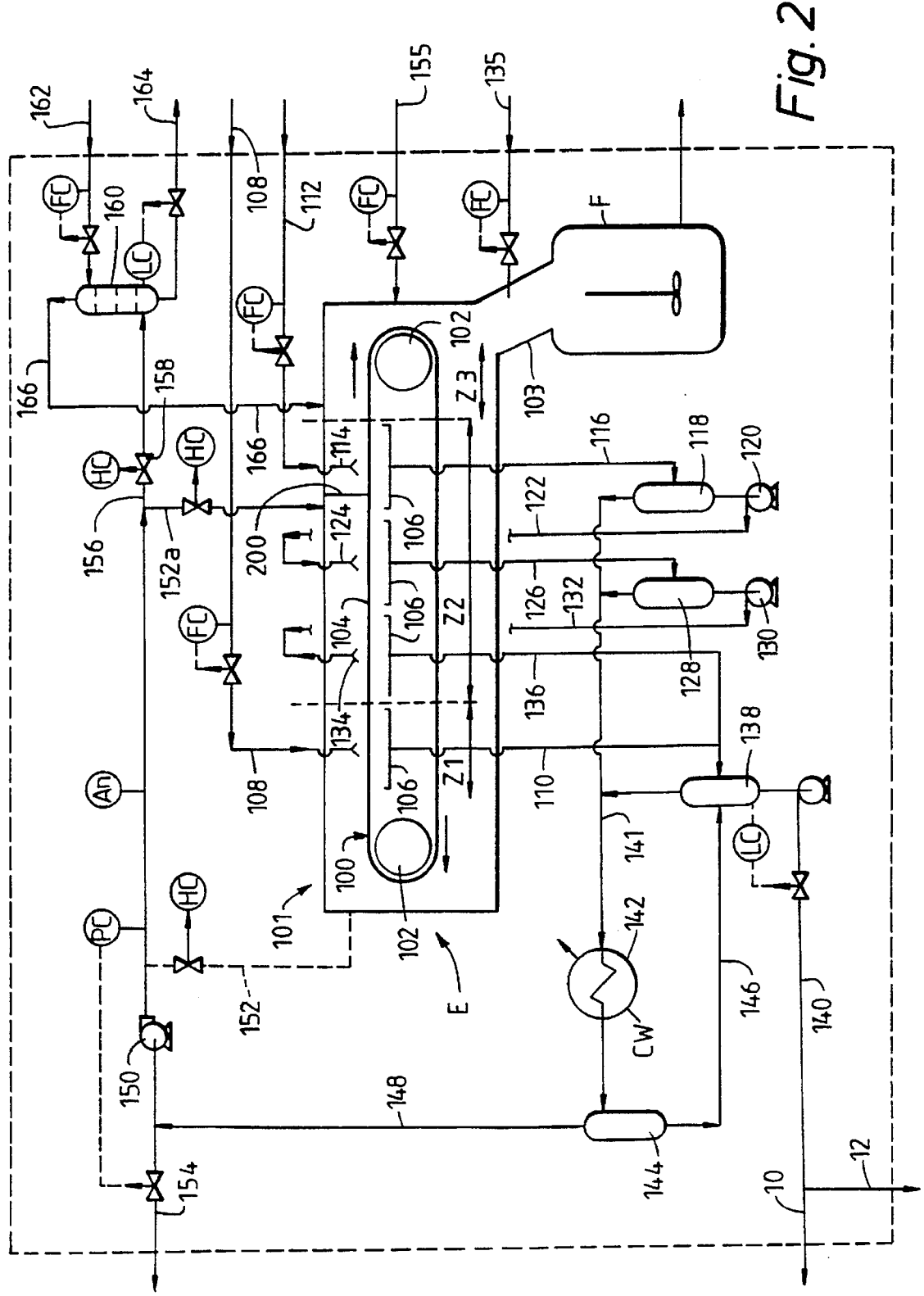
FIG. 2 is a schematic representation of a filtration and washing system which operates in accordance with the present invention.

Referring to FIG. 2, the filtration stage E and reslurry stage F are integrated into a unit in which the terephthalic acid crystals are also washed to reduce or eliminate acetic acid contamination thereof. The unit shown in FIG. 2 comprises belt filter equipment such as a Pannevis filter of the form generally described in Filtration and Separation (Page 176 et seq, Mar./Apr. 1979). The belt filter equipment comprises a generally horizontally disposed filter belt 100 which runs over two drums 102 and a series of rollers (not shown), suitable drive means being provided for driving the filter belt 100 so that the upper run 104 thereof travels from left to right as seen in FIG. 2. The filter belt 100 may comprise a cloth woven from polyetheretherketone monofilaments using a suitable weave.

The filter band 100 is enclosed in vapour tight housing 101 one end of which, located adjacent the downstream end of the belt filter upper run 104, is connected to the reslurry vessel F by a discharge chute 103. The interior of the housing is pressurised with a suitable gas (as discussed hereinafter), the pressure within the housing typically being in excess of 1 bara, eg 3 to 15 bara. Beneath the upper run, a suction tray unit is located which, in the illustrated embodiment, comprises four trays 106. The trays 106 are coupled together for movement as a unit in a direction parallel to the direction of travel of the upper belt run 104, the tray unit being movable in a reciprocating fashion between the drums 102 such that it can travel with the belt from one position adjacent the left hand drum to a position adjacent the right hand drum and then return to the first position. During travel of the tray unit 106 from left to right, suction is applied to draw liquid through the upper run 104 of the belt and during the reverse travel, suction is terminated. The pressure differential across the filter belt (ie. between the region above the upper run 104 and the interior of the suction tray unit 106) is usually at least 0.03 bar and typically of the order of 0.6 bar.

Dotted lines show the locations of three zones Z1, Z2 and Z3. In the first zone Z1 on the left, a slurry of terephthalic acid and acetic acid together with any dissolved catalyst is introduced via line 108 onto the upper run 104 of the filter belt and acetic acid is drawn through the belt into suction tray 106 from which it is removed via line 110, thereby leaving a filter cake (typically at least one inch thick) of terephthalic acid on the upper run 104. At this stage, the filter cake will contain residual contaminants, particularly residual acetic acid.

In the second zone Z2, a wash medium (typically water) is introduced via line 112 and passes through the belt run 104 in countercurrent fashion relative to the direction of travel of the filter cake. The wash medium is initially discharged onto the filter cake via outlet 114 so as form a layer over the filter cake and is effective with the assistance of the gas pressure within the housing 101 to displace contaminants such as acetic acid, if still present, through the belt run 104 into the suction tray unit, the displaced acetic acid and wash medium being drawn through the upper run 104 and into the tray unit 106 from which the resulting filtrate (wash medium and residual acetic acid) is withdrawn and re-used for washing of the filter cake at a position upstream of outlet 114. In particular, the filtrate is passed via line 116 to filtrate receiver 118 and is pumped by pump 120 via line 122 to outlet 124 upstream of outlet 114 so that the filtrate is effective to displace acetic acid and any other contaminants through the upper run 104 into the suction tray unit 106. In the illustrated embodiment, the procedure is repeated again using liquor supplied via line 126, filtrate receiver 128, pump 130, line 132 and outlet 134. In this manner, the filter cake on the upper run 104 may be washed with increasingly purer water as it traverses the three washing stages corresponding to the outlets 134, 124 and 114.

In the third zone Z3, the filter cake is discharged from the filter belt 100 and water discharged from nozzles (not shown) onto the filter belt 100 serves to dislodge any filter cake tending to adhere to the filter belt. The discharged filter cake falls into the discharge chute 103 to which water is fed via line 135, this water being derived from lines 14, 16, 17 and/or 18 (FIG. 1). The water employed to dislodge the filter cake from the filter belt and/or to supply the outlet 114 may be derived at least in part from line 14, 16, 17 and/or 18 (see FIG. 1). The filtrate obtained after passage of the wash medium (comprising for example water and contaminants, particularly acetic acid derived from the previous wash stages) from outlet 134 through the filter cake is collected in suction tray unit 106 and is passed to filtrate via line 136 and is passed to mother liquor receiver 138 together with the filtrate recovered via line 110 from the first zone Z1. Mother liquor recovered in this way may be returned at least in part via line 140 (and line 10) to the reactor A optionally by first mixing with the fresh catalyst, paraxylene and acetic acid contained in line 1. Any remaining mother liquor and wash liquid is suitably passed to an evaporation stage G via line 12 (FIGS. 1 and 2) in which water and acetic acid vapour is removed by line 11, condensed and passed to reactor A or optionally passed to distillation column D and a purge of by products and catalyst is withdrawn via stream 13.

From the foregoing, it will be seen that the filtration equipment described performs the dual role of separating terephthalic acid crystals from acetic acid rich mother liquor and washing the separated filter cake with water to displace residual acetic acid mother liquor, the overall effect being solvent interchange, ie. replacement of the acetic acid solvent by water. Both duties are performed on a single substantially horizontal belt with the washing duty being performed by means of a multi-stage countercurrent wash. In order to achieve a high overall wash efficiency, cross-mixing of liquor between the wash stages must be minimised. This is achieved by allowing a small mount of gas breakthrough between the stages, ie. after all liquor on the surface has been displaced through the filter cake in each stage/zone.

Because of the presence of flammable materials within the oxidation plant, the belt filter system is inerted by the introduction of a suitable gas (typically nitrogen) into the housing 101. During operation of the belt filter, nitrogen drawn through the cake onto the lower pressure side becomes near saturated with acetic acid/water vapours. The nitrogen and acetic acid/water vapours enter the receivers 118, 128 and 138 and are collected via line 141 and passed to a vapour condenser 142 where the nitrogen is substantially freed of the acetic acid/water vapours, the latter being condensed and circulated via knock-out drum 144 and line 146 to the mother liquor receiver 138. The nitrogen recovered in this way is recompressed and returned to the housing 101 via line 148, recirculation blower 150 and valve-controlled line 152. Part of the nitrogen circulating this "closed loop" system is bled off via valve-controlled line 154 in order to regulate the oxygen concentration in the system and make-up nitrogen is introduced into the housing via line 155.

Instead of the condenser 142/knock-out drum 144 arrangement described above in which condensation of the condensibles is effected by indirect heat exchange in condenser 142, in an alternative arrangement, these components are replaced by a scrubbing tower in which the nitrogen and acetic acid/water vapours are contacted with a cooled scrubbing liquor (which itself may be derived at least in part from the condensed acetic acid/water vapours) to effect direct, rather than indirect, heat exchange. After contact with the incoming nitrogen and acetic acid/water vapours, the scrubbing liquor and condensed vapours are withdrawn from the bottom of the scrubbing tower and may be recirculated back at least in part to the top of the tower via an indirect heat exchanger to effect cooling of the scrubbing liquor.

It has been determined that whilst a filtration and washing system as described above is particularly effective in displacing mother liquor from the filter cake, unaccountably the filtered and washed terephthalic acid may still have an undesirably high residual acetic acid content despite being subjected to extensive washing with a countercurrent washing arrangement, suggesting that the washing efficiency may not be as efficient as expected. Surprisingly, the unexpectedly high level of residual acetic acid in the washed terephthalic acid has been found not to be attributable to poor washing efficiency. It transpires that the inerting gas itself is the source of the problem and also terephthalic acid has been found to exhibit a propensity to take up acetic acid from the nitrogen; thus, irrespective of the efficiency of acetic acid/water vapour removal from the gas prior to recycling the gas, the manner in which the gas is re-introduced into the housing 101 and the manner in which it passes through the housing are important factors in determining the extent of residual acetic acid contamination in the crude terephthalic acid recovered from the filtration and washing system.

In zone Z1, where the hot feed slurry enters the housing 101, some evaporation of the acetic acid/water present in the slurry occurs into the surrounding vapour space. If the recycle gas is returned to the housing 101 at a location such as that indicated by line 152, then it will tend to distribute itself around the housing 101 to satisfy the flow requirements through the cake, and in particular it will tend to flow downstream co-current with the direction of travel of the filter cake. As a result, it has been found that the gas tends to sweep evaporated acetic acid/water downstream with potential for recontamination of the terephthalic acid filter cake with acetic acid especially in the final washing stages and beyond.

In experimental work, we have established that nitrogen saturated with acetic acid, if drawn through an "acetic acid free" filter cake, leads to significant contamination of the filter cake with acetic acid. In one experiment, 4.8 dm$^3$ of nitrogen gas at 40° C. saturated with acetic acid vapour was drawn through a 40 mm thick cake of terephthalic acid on a 100 cm$^2$ Buchner funnel over a 10 second period. The initial cake acetic acid content was less than 100 ppm w/w acetic acid; after the gas had been drawn through the cake, the acetic acid content has risen to 0.27% w/w at the top of the cake, falling to 0.14% w/w at the bottom of the cake, demonstrating the surprising propensity of terephthalic acid to take up acetic acid in the gas stream. Very little acetic acid was detected in the exit nitrogen stream.

By locating the re-entry point for the recycle nitrogen gas at or adjacent the downstream end of the housing 101 (for instance, as indicated by reference numeral 152a), it is possible to secure redistribution of the gas in such a way that the gas tends to flow counter-current to the direction of travel of the filter cake upstream of the location 152a, and hence counter-current to the acetic acid "gradient" in the filter cake. For a relatively low acetic acid content in the recycle gas, this ensures that acetic acid rich vapours reside at the upstream end of the housing 101 and are substantially prevented from flowing co-current with the filter cake, especially into the final washing stage of zone Z2.

Even relatively low acetic acid content in the recycle gas can cause significant contamination of the filter cake in the later wash stage(s) if very high overall washing efficiency is required. In this event, the recycled gas may be subjected to aqueous scrubbing or other technique for removing acetic acid before being introduced into the housing at or adjacent the downstream end thereof. Thus, for example, the gas obtained from the knockout drum 144 may be scrubbed before being returned to the housing 101. However, because it is over the final wash stage(s) where re-contamination of the filter cake by the gas is especially important, rather than scrub the entire quantity of recycle nitrogen which would require a scrubber of substantial size, a more cost effective approach is achieved by splitting the recycle nitrogen into two streams. One stream is returned via line 152a (without scrubbing) and the other stream is routed via line 156 and valve 158 to a relatively small scrubber 160 in which the nitrogen gas is contacted in counter-current fashion with an aqueous scrubbing medium (which may be derived from any one or more of lines 14, 16, 17 and 18) introduced via line 162 and withdrawn via line 164. The scrubbed nitrogen (which is substantially freed of acetic acid) is then routed via line 166 to a location within the housing 101 adjacent the filter cake discharge end so that it passes through the filter cake at least in the final washing stage(s) and/or a location beyond the latter.

In this manner, the nitrogen with differing acetic acid contents is re-introduced at two locations. The overall effect is to achieve a counter-current sweep of vapour towards zone Z1, with near "acetic acid free" vapour contacting the "cleanest" cake. For similar reasons, the make-up nitrogen fed into the housing 101 via line 155 enters at the cake discharge end of the housing 101 for example as shown or at a location such that it is effective to purge the vessel F. A curtain 200 (for instance in the form of a suspended flap of flexible material such as rubber) may be used inside the housing 101 to further assist in partitioning the "clean" and "dirty" gas sections.

In reslurry vessel F the crystals may be reslurried with water recovered from the distillation column D via stream 14 and/or other water which may be recycle mother liquor via stream 18, recycle mother liquor via stream 16 and/or demineralised water via stream 17. The slurry produced in this stage is heated in section H to a temperature of for example 250° C. to 350° C. to form a solution which is passed via stream 19 to reactor J in which it is reacted with hydrogen over a fixed bed palladium catalyst thus reducing impurities in the solution and then again crystallised in crystallisation section K from which pure product is separated and dried in stage L which my comprise a filter/ washing system similar to that described above in relation to FIG. 2, and a drier. In this instance, the washing process is employed primarily to displace mother liquor comprising water and some dissolved paratoluic acid and other impurities (eg. colour impurities, metals, etc.) from the terephthalic acid and the washing process may not need to be as extensive in which case the counter-current arrangement may be dispensed with. Thus, for example, in the filtration/ washing process for the purified terephthalic acid the arrangement may be such that the wash medium only makes one pass of the filter cake.

The temperature to which the solution is cooled in the crystallisation section K and the rapidity of cooling is adjusted to produce the appropriate purity of the desired terephthalic acid product. The pure terephthalic acid product is recovered from stage L and the mother liquor from the separation is passed to recovery stage M in which the liquid is evaporated or further cooled so as to permit the recovery of further solids which may be passed back to reactor A via stream 20. In stage M the temperature of the liquor may be reduced to 100° C. by flashing steam from it at atmospheric pressure. Such steam may be further purified for example by distillation and used if desired as wash in stage L, used elsewhere in the process or purged. The remaining liquor may be cooled or evaporated further and solids separated from it. The mother liquor recovered from stage M may be in part passed back to the distillation column D via line 22, in part be returned to the reslurry stage F via stream 16 and in part be purged via stream 21. Preferably if evaporation is used the evaporated water is returned to the reslurry stage F.

Where the stage L comprises a filtration and washing system similar to that described in relation to FIG. 2, the inerting gas may again be nitrogen; however, it is preferred to employ steam as the inerting gas for reasons that are disclosed in copending International Patent Application No. PCT/GB 93 01019. In this event, the filtration/washing system would be employed in an analagous manner to separate pure terephthalic acid crystals from dirty mother liquor and wash the separated filter cake with clean water to displace any residual dirty mother liquor from the cake. In these circumstances, the steam is employed so as to develop a counter-current sweep of steam so as to ensure that any volatiles in the dirty mother liquor are retained at the upstream, slurry feed end of the filter belt.

Although the invention is disclosed herein with reference to a filter belt type application, it will be appreciated that it may also be applied to other types of filtration system suitable for carrying out filter cake washing, eg the invention may be applied to a rotary suction filter in which the solids material is transported by a cylindrical drum-mounted filter medium through filtration and washing stages and in which the filtration and washing process is enhanced by a pressurised gas, with a pressure differential established between opposite sides of the filter cake in use. As described in relation to FIG. 2, in such an embodiment the pressurised gas is drawn through the filter cake and then recycled, following treatment to eliminate or reduce contaminants, to a location corresponding to the downstream end of the path of travel of the filter cake.

I claim:
1. A method of displacing liquor from a particulate solid material comprising:
   forming the particulate solid material into a layer on a movable filter medium;
   transporting the layer by means of the filter medium through a washing zone in which the layer is contacted along the path of movement thereof with a wash medium, the wash medium serving to displace liquor from the layer and passing through the filter medium;
   establishing over said layer a gaseous atmosphere from which gas passes through the layer; and supplying gas to the gaseous atmosphere so as to produce a concentration gradient within the gaseous atmosphere such that the liquor content of the gas passing through said layer increases in a direction counter-current to the direction of travel of said layer.

2. A method as claimed in claim 1 in which said concentration gradient is produced by effecting flow of said gas in countercurrent relation with the direction of travel of the layer of particulate solid material whereby liquor evaporating from the layer of particulate solid material in said zone and upstream of said zone is substantially prevented from passing downstream of said zone.

3. A method of displacing liquor from a particulate solid material comprising:
   forming the particulate solid material into a layer on a movable filter medium;
   transporting the layer by means of the filter medium through a washing zone in which the layer is contacted alone the path of movement thereof with a wash medium while maintaining in a region over the layer a gaseous atmosphere, the wash medium serving to displace liquor from the layer and passing, together with the liquor and gas from said atmosphere, through the filter medium;
   recovering the gas and treating it to eliminate or at least reduce contamination thereof by the liquor; and
   reintroducing the treated gas into said atmosphere at a location such that the gas passing through the layer at a location downstream of, or within a downstream section of, the washing zone is less contaminated with liquor than that passing through the layer at a location upstream of, or within an upstream section of, the washing zone.

4. A method as claimed in any one of claims 1 to 3 in which the filter medium moves continuously through said washing zone.

5. A method as claimed in any one of claims 1 to 3 in which the washing zone comprises a series of washing stages arranged in succession along the path of travel of the filter medium through the washing zone.

6. A method as claimed in claim 5 in which the washing medium is passed through the washing stages in counter-current relation with the direction of movement of the filter medium.

7. A method as claimed in claim 3 in which the recovered gas is separated into two streams which are treated to differing extents such that one stream has a lower contaminant level than the other, and in which the two streams are reintroduced into said atmosphere at different locations, said one stream being reintroduced at a location downstream of the location at which the other stream is reintroduced.

8. A method as claimed in claim 7 in which the recovered gas is subjected to cooling prior to being split into two streams so that contaminants in the vapour phase are substantially condensed and thereby separated from the gas.

9. A method as claimed in claim 8 in which, following said cooling, the gas is split into two streams, said other stream being reintroduced into the gaseous atmosphere without further treatment for contaminant removal.

10. A method as claimed in claim 9 in which said one stream is subjected to further treatment to reduce the level of contaminants therein.

11. A method as claimed in any one of claims 1 to 3 and 7 to 10 in which the filter medium comprises an endless filter belt having a generally horizontal upper run on which the layer of solids material is formed.

12. A method as claimed in any one of claims 1 to 3 and 7 to 10 in which the particulate solid material comprises terephthalic acid crystals derived from the liquid phase oxidation of p-xylene in a lower aliphatic carboxylic acid medium.

13. A method as claimed in claim 12 in which, following said washing treatment, the recovered terephthalic acid is used, without further chemical purification, in the production of polyester.

14. A process for the filtration and washing of terephthalic acid obtained from a reaction vessel as a slurry with an aliphatic carboxylic acid employed as solvent in the reaction, said process comprising:

(a) contacting the terephthalic acid, initially in the form of said slurry, with a filtration surface acting as a support so as to form the terephthalic acid as a layer on said surface and transporting the terephthalic acid on said filtration surface through a number of zones;

(b) initially subjecting the slurry to filtration while traversing a first zone to remove said solvent through the filtration surface and thereby produce a first drained wet deposit;

(c) thereafter washing the first wet deposit while traversing a second zone and effecting filtration through said filtration surface to separate from the terephthalic acid any solvent remaining in the first deposit and the wash liquor used for washing;

(d) establishing in said second zone and/or at least one further zone downstream of the second zone a gaseous atmosphere by means of a gas which passes through the filter medium; and supplying said gas in such a way that a concentration gradient is produced in the gas atmosphere such that solvent contamination in the gas passing from said atmosphere through the filter medium decreases in the direction of travel of the filter medium.

15. A process as claimed in claim 14 in which the filter medium is configured as a cylindrical loop.

16. A process as claimed in claim 14 in which the filter medium is configured as a cylindrical loop comprising a series of discrete sections and in which the gas is employed to effect drying of the filtered and washed terephthalic acid.

17. A process for the filtration and washing of terephthalic acid obtained from a reaction vessel as a slurry with an aliphatic carboxylic acid employed as solvent in the reaction, said process comprising:

(a) contacting the terephthalic acid, initially in the form of said slurry, with a filtration surface acting as a support so as to form the terephthalic acid as a layer on said surface and transporting the terephthalic acid on said filtration surface through first and second zones;

(b) initially subjecting the slurry to filtration while traversing said first zone to remove said solvent through the filtration surface and thereby produce a first drained wet deposit;

(c) thereafter subjecting the first wet deposit to a series of washing stages while traversing said second zone and effecting filtration through said filtration surface to separate from the terephthalic acid any solvent remaining in the first deposit and the wash liquor used for washing, said washing stages with the exception of the final washing stage being effected using wash liquor obtained from a succeeding stage in countercurrent fashion so that said deposit is contacted with wash liquor of increasing purity as it progresses through said second zone;

(d) pressurising said first and second zones by means of a gas which passes through the filter medium together with the solvent and the wash liquor; and (e) supplying said pressurising gas in such a way that, on the slurry side of the filter surface, the gas present in at least the final stage of said second zone is less contaminated with said solvent than the gas present in said first zone.

18. A process as claimed in any one of claims 14 to 17 in which following passage through the filter surface the gas is recovered, treated to separate the gas from solvent vapours entrained in the gas flow and re-introduced into the gaseous atmosphere at different locations along the path of travel of the filter surface, the gas supplied to the more downstream location or locations being subjected to a higher degree of separation from said solvent.

19. A system for processing a slurry comprising particulate solid material and a liquor, said system comprising:

means for filtering the particulate solid material to form a layer thereof on a movable filter medium;

a washing zone;

means for driving the filter medium so as to transport the layer through the washing zone;

means for applying wash medium to the layer during traverse of the washing zone, the wash medium serving to displace liquor from the layer and passing through the filter medium; and means for establishing in said washing zone and/or a zone downstream thereof a gaseous atmosphere from which gas passes through the layer and the filter medium, said atmosphere-establishing means being arranged to produce a concentration gradient such that the extent to which the gas passing through said layer and the filter medium is contaminated with said liquor decreases in the direction of travel of the filter medium.

20. A system as claimed in claim 19 including means for recovering the gas after passage through said layer and treating it to eliminate or at least reduce contamination thereof by the liquor: and means for reintroducing the treated gas into said atmosphere at one or more locations to produce said concentration gradient.

21. A system as claimed in claim 20 in which the means for treating the recovered gas produces at least two gas streams at least one of which is less contaminated with solvent than the others or others and is reintroduced into said atmosphere at a location downstream of the other gas stream or streams.

22. A process for the filtration and washing of terephthalic acid obtained from a reaction vessel as a slurry with an aliphatic carboxylic acid employed as solvent in the reaction, said process comprising:

(a) contacting the terephthalic acid, initially in the form of said slurry, with a filtration surface acting as a support so as to form the terephthalic acid as a layer on said surface and transporting the terephthalic acid on said filtration surface through a number of zones;

(b) initially subjecting the slurry to filtration while traversing a first zone to remove said solvent through the filtration surface and thereby produce a first drained wet deposit;

(c) thereafter washing the first wet deposit while traversing a second zone and effecting filtration through said filtration surface to separate from the terephthalic acid any solvent remaining in the first deposit and the wash liquor used for washing;

(d) establishing in said second zone and/or at least one further zone downstream of the second zone a gaseous atmosphere by means of a gas which passes through the filter medium; and supplying said gas in such a way that a concentration gradient is produced in the gas atmosphere such that solvent contamination in the gas passing from said atmosphere through the filter medium decreases in the direction of travel of the filter medium;

(e) separating the gas from solvent vapours entrained in the gas flow; and (f) re-introducing the gas into the gaseous atmosphere at different locations along the path of travel of the filter surface, the gas supplied to the more downstream location or locations being subjected to a higher degree of separation from said solvent.

23. A process for the filtration and washing of terephthalic acid obtained from a reaction vessel as a slurry with an aliphatic carboxylic acid employed as solvent in the reaction, said process comprising:

(a) contacting the terephthalic acid, initially in the form of said slurry, with a filtration surface acting as a support so as to form the terephthalic acid as a layer on said surface and transporting the terephthalic acid on said filtration surface through first and second zones;

(b) initially subjecting the slurry to filtration while traversing said first zone to remove said solvent through the filtration surface and thereby produce a first drained wet deposit;

(c) thereafter subjecting the first wet deposit to a series of washing stages while traversing said second zone and effecting filtration through said filtration surface to separate from the terephthalic acid any solvent remaining in the first deposit and the wash liquor used for washing, said washing stages with the exception of the final washing stage being effected using wash liquor from a succeeding stage in countercurrent fashion so that said deposit is contacted with wash liquor of increasing purity as it progresses through said second zone;

(d) pressurising said first and second zones by means of a gas which passes through the filter medium together with the solvent and the wash liquor; and (e) supplying said pressurising gas in such a way that, on the slurry side of the filter surface, the gas present in at least the final stage of said second zone is less contaminated with said solvent than the gas present in said first zone;

(f) separating the gas from solvent vapours entrained in the gas flow; and (g) re-introducing the gas into the gaseous atmosphere at different locations along the path of travel of the filter surface, the gas supplied to the more downstream location or locations being subjected to a higher degree of separation from said solvent.

24. A system for processing a slurry comprising a particulate solid material and a liquor, said system comprising:

means for filtering the particulate solid material to form a layer thereof on a movable filter medium; a washing zone; means for driving the filter medium so as to transport the layer through the washing zone;

means for applying wash medium to the layer during traverse of the washing zone, the wash medium serving to displace liquor from the layer and passing through the filter medium; and means for establishing in said washing zone and/or a zone downstream thereof a gaseous atmosphere from which gas passes through the layer and the filter medium, said atmosphere-establishing means being arranged to produce a concentration gradient such that the extent to which the gas passing through said layer and the filter medium is contaminated with said liquor decreases in the direction of travel of the filter medium;

means for recovering the gas after passage through said layer and treating it to eliminate or at least reduce contamination thereof by the liquor, wherein the recovered gas produces at least two gas streams, at least one of which is less contaminated with solvent than the other or others, and is reintroduced into said atmosphere at a location downstream of the other gas stream or streams to produce said concentration gradient.

* * * * *

UNITED STATES PATENT AND TRADEMARK OFFICE
CERTIFICATE OF CORRECTION

PATENT NO. : 5,643,468
DATED : July 1, 1997
INVENTOR(S) : Alan Macpherson Ure

It is certified that error appears in the above-identified patent and that said Letters Patent is hereby corrected as shown below:

On the title page, item[56] References Cited, the following patent documents should be listed under FOREIGN PATENT DOCUMENTS:

| | | |
|---|---|---|
| 662,685 | 8/1965 | Belgium |
| 3222235 | 12/1983 | Germany |
| 3626695 | 11/1987 | Germany |

Signed and Sealed this

Twenty-first Day of October 1997

Attest:

BRUCE LEHMAN

Attesting Officer

Commissioner of Patents and Trademarks